US010681617B2

(12) United States Patent
Tipton et al.

(10) Patent No.: US 10,681,617 B2
(45) Date of Patent: *Jun. 9, 2020

(54) PUBLIC/PRIVATE INDICATOR BASED ACCESS POINT CONNECTION PERMISSION

(71) Applicant: AT&T INTELLECTUAL PROPERTY I, L.P., Atlanta, GA (US)

(72) Inventors: Rick Tipton, Corryton, TN (US); Sheldon Kent Meredith, Roswell, GA (US); Christine Thomas, Atlanta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/239,510

(22) Filed: Jan. 3, 2019

(65) Prior Publication Data

US 2019/0141611 A1  May 9, 2019

Related U.S. Application Data

(63) Continuation of application No. 15/365,338, filed on Nov. 30, 2016, now Pat. No. 10,200,936.

(51) Int. Cl.
*H04W 48/08* (2009.01)
*H04W 76/11* (2018.01)
(Continued)

(52) U.S. Cl.
CPC .......... *H04W 48/08* (2013.01); *H04W 48/04* (2013.01); *H04W 64/00* (2013.01); *H04W 76/11* (2018.02);
(Continued)

(58) Field of Classification Search
CPC .... H04L 1/0015; H04L 63/102; H04W 24/00; H04W 74/06
See application file for complete search history.

(56) References Cited

U.S. PATENT DOCUMENTS

| 4,718,081 A | 1/1988 | Brenig |
| 5,799,256 A | 8/1998 | Pombo et al. |

(Continued)

FOREIGN PATENT DOCUMENTS

| CN | 101841601 A | 9/2010 |
| CN | 104881839 A | 9/2015 |

(Continued)

OTHER PUBLICATIONS

Derr, et al., "Wireless Indoor Location Estimation Based on Neural Network RSS Signature Recognition (LENSR)". 3rd IEEE Conference on Industrial Electronics and Applications, Jun. 2008, 7 pages.

(Continued)

*Primary Examiner* — Iqbal Zaidi
(74) *Attorney, Agent, or Firm* — Amin, Turocy & Watson, LLP

(57) ABSTRACT

Determining a permission for a user equipment to connect to an access point based on the public/private status of the access point device is disclosed. The permission can be based on a historic user equipment density for an area comprising the location of the access point device. The permission can be further based on analysis of an access point device identifier. Analysis of the access point device identifier can be based on comparing a portion of the access point device identifier to a term associated with either a public status or a private status of the access point device. In an embodiment, the access point device identifier can be an SSID, such as for a Wi-Fi network, whereby the SSID can be parsed into keywords that can be compared to the term. Ranking and/or white/blacklisting can be performed based on the analysis of the access point device identifier.

20 Claims, 10 Drawing Sheets

(51) Int. Cl.
*H04W 64/00* (2009.01)
*H04W 84/12* (2009.01)
*H04W 88/02* (2009.01)
*H04W 48/04* (2009.01)
*H04W 88/08* (2009.01)

(52) U.S. Cl.
CPC ............ *H04W 84/12* (2013.01); *H04W 88/02* (2013.01); *H04W 88/08* (2013.01)

(56) References Cited

U.S. PATENT DOCUMENTS

| | | | |
|---|---|---|---|
| 6,556,822 | B1 | 4/2003 | Matsumoto |
| 6,813,501 | B2 | 11/2004 | Kinnunen et al. |
| 7,400,604 | B2 | 7/2008 | Lee |
| 7,466,986 | B2 | 12/2008 | Halcrow et al. |
| 7,532,898 | B2 | 5/2009 | Halcrow et al. |
| 7,738,884 | B2 | 6/2010 | Cheung et al. |
| 7,945,271 | B1 | 5/2011 | Barnes et al. |
| 8,320,285 | B2 | 11/2012 | Kitani |
| 8,364,155 | B1 | 1/2013 | Ahmed et al. |
| 8,427,942 | B2 * | 4/2013 | Kim ...................... H04W 48/16 370/229 |
| 8,593,952 | B2 | 11/2013 | Puthenpura et al. |
| 9,059,802 | B2 | 6/2015 | Tipton et al. |
| 9,258,770 | B2 | 2/2016 | Wuellner et al. |
| 2003/0008668 | A1 | 1/2003 | Perez-Breva et al. |
| 2004/0052231 | A1 | 3/2004 | Ramaswamy et al. |
| 2004/0090943 | A1 | 5/2004 | Da Costa et al. |
| 2005/0020278 | A1 | 1/2005 | Krumm et al. |
| 2005/0048986 | A1 | 3/2005 | Zhao |
| 2006/0030350 | A1 | 2/2006 | Mitchell |
| 2006/0181413 | A1 | 8/2006 | Mostov |
| 2006/0209882 | A1 | 9/2006 | Han et al. |
| 2006/0217147 | A1 | 9/2006 | Olvera-Hernandez et al. |
| 2006/0280226 | A1 | 12/2006 | Krasner |
| 2007/0008925 | A1 | 1/2007 | Dravida et al. |
| 2008/0132239 | A1 | 6/2008 | Khetawat et al. |
| 2008/0165680 | A1 | 7/2008 | Chang |
| 2008/0205358 | A1 | 8/2008 | Jokela |
| 2008/0207222 | A1 | 8/2008 | Bhattacharya et al. |
| 2008/0305786 | A1 | 12/2008 | Arumi et al. |
| 2009/0042557 | A1 | 2/2009 | Vardi |
| 2009/0046654 | A1 | 2/2009 | Hoshi et al. |
| 2009/0111485 | A1 | 4/2009 | Kitani et al. |
| 2009/0182533 | A1 | 7/2009 | Neuenschwander et al. |
| 2009/0196268 | A1 | 8/2009 | Caldwell et al. |
| 2009/0268654 | A1 | 10/2009 | Baglin |
| 2009/0278705 | A1 | 11/2009 | Chhabra et al. |
| 2009/0279520 | A1 | 11/2009 | Maki |
| 2010/0085947 | A1 | 4/2010 | Ringland et al. |
| 2010/0110921 | A1 | 5/2010 | Famolari |
| 2010/0255856 | A1 * | 10/2010 | Kansal .................. G01S 5/0205 455/456.1 |
| 2010/0255891 | A1 | 10/2010 | Conway et al. |
| 2011/0153816 | A1 | 6/2011 | Lloyd et al. |
| 2011/0222523 | A1 | 9/2011 | Fu et al. |
| 2012/0149388 | A1 | 6/2012 | West et al. |
| 2012/0286997 | A1 | 11/2012 | Lin et al. |
| 2013/0090086 | A1 * | 4/2013 | Lopez Lopez ........ H04W 12/12 455/410 |
| 2013/0226857 | A1 | 8/2013 | Shim et al. |
| 2014/0094187 | A1 | 4/2014 | LaMarca et al. |
| 2014/0341198 | A1 | 11/2014 | Han |
| 2014/0348013 | A1 | 11/2014 | Terrenoir et al. |
| 2015/0215941 | A1 | 7/2015 | Cook et al. |
| 2015/0319660 | A1 | 11/2015 | Helbert |
| 2015/0365804 | A1 | 12/2015 | Chen et al. |
| 2016/0021514 | A1 | 1/2016 | Marti et al. |
| 2016/0112150 | A1 | 4/2016 | Godefroy et al. |

FOREIGN PATENT DOCUMENTS

| | | |
|---|---|---|
| JP | 2005537695 A | 12/2005 |
| JP | 2006067103 A | 3/2006 |
| JP | 2008118722 | 5/2008 |
| JP | 2008278313 A | 11/2008 |
| JP | 2008312067 | 12/2008 |
| JP | 2009135708 | 6/2009 |
| JP | 2009152899 | 7/2009 |
| JP | 2009159408 | 7/2009 |
| JP | 2009-246874 | 10/2009 |
| JP | 2010-114774 | 5/2010 |
| WO | 2008084621 A1 | 7/2008 |
| WO | 2009137718 A1 | 11/2009 |

OTHER PUBLICATIONS

Takenga, "Received Signal Strength based Fingerprint Positioning in Cellular Networks involving Neural Networks and Tracking Techniques". (2007) 9 pages.
Simonite, "Bringing Cell-Phone Location-Sensing Indoors". Technology review published by MIT, Aug. 31, 2010, 2 pages.
"Point Inside Technologies". © 2011, Piont Inside Inc. http://pointinside.com/products-services/overview/, Jul. 17, 2011, 3 pages.
Manzuri, et al., "Mobile Positioning using Enhanced Signature Database Method and Error Reduction in Location Grid". 2009 International Conference on Communications and Mobile Computing.
"Radar". Microsoft research. http://research.microsoft.com/en-us/projects/radar/default.aspx , Jul. 17, 2011, 3 pages.
Siddiqi, "Experiments in Monte-Carlo Localization using WiFi Signal Strength", Jul. 20, 2011, 8 pages.
"Determining your location using only wifi signals". http://stackoverflow.com/questions/524351/determining-your-location-using-only-wifi-signals, Jul. 17, 2011, 3 pages.
Zaruba, et al., "Indoor location tracking using RSSI readings from a single Wi-Fi accessed point." Jun. 8, 2006 ©Springer Science + Business Media, LLC 2006, 15 pages.
International Search Report for PCT/US2011/037332, published Nov. 24, 2011, 3 pages.
3GPP TS 24.302 V8.1.0 Mar. 2009 Access to 3GPP EPC via non-3GPP access networks, Mar. 2009, 43 pages.
3GPP TS 25.305 V8.1.0 Dec. 2008 Stage 2 functional specification of User equipment positioning in UTRAN, Dec. 2008, 79 pages.
Office Action dated Aug. 15, 2012 for U.S. Appl. No. 12/883,145, 40 pages.
Office Action dated Jan. 30, 2013 for U.S. Appl. No. 12/883,145, 25 pages.
Office Action dated Nov. 26, 2013 for U.S. Appl. No. 13/292,736, 49 pages.
Japanese Office Action dated Apr. 3, 2014 for Japanese Patent Application No. 2013-511386, 6 pages.
Office Action dated Jul. 14, 2014 for U.S. Appl. No. 13/292,736, 15 pages.
Taheri, et al. (Taheri, A.; Singh, A.; Emmanuel, A., "Location fingerprinting on infrastructure 802.11 wireless local area networks (WLANs) using Locus," Local Computer Networks, 2004. 29th Annual IEEE International Conference on , vol., No., pp. 676,683, Nov. 16-18, 2004 doi: 10.1109/LCN.2004.74).
Notice of Allowance dated Jan. 27, 2015 for U.S. Appl. No. 13/292,736, 16 pages.
Office Action dated Dec. 30, 2014 for U.S. Appl. No. 14/040,428, 32 pages.
Chinese Office Action dated Jan. 29, 2015 for Chinese Patent Application No. 201180024885.3, 6 pages.
Japanese Office Action, dated Jan. 29, 2015, for Japanese Patent Application No. 2013-511386, 13 pages.
Japanese Office Action drafted Aug. 31, 2015, dated Sep. 3, 2015 for Japanese Patent Application No. 2013-511386, 11 pages (with translation).
Chinese Office Action dated Sep. 28, 2015 for Chinese Patent Application No. 201180024885.3, 6 pages.
Final Office Action dated Sep. 30, 2015 for U.S. Appl. No. 14/040,428, 57 pages.
Japanese Office Action for Japanese Application No. 2013-511386 dated Mar. 29, 2016, 16 pages (with translation).

(56) References Cited

OTHER PUBLICATIONS

Office Action dated Feb. 10, 2016 for U.S. Appl. No. 14/040,428, 63 pages.
Final Office Action dated Aug. 24, 2016 for U.S. Appl. No. 14/040,428, 63 pages.
Japanese Office Action for Japanese Application No. 2013-511386 dated Jul. 26, 2016, 16 pages.
Korean Office Action for Korean Application No. 10-2012-7029896 dated Sep. 22, 2016, 9 pages.
Office Action dated Dec. 23, 2016 for U.S. Appl. No. 14/040,428, 63 pages.
Office Action dated Mar. 22, 2017 for U.S. Appl. No. 14/696,260, 65 pages.
Notice of Allowance dated Jun. 28, 2017 for U.S. Appl. No. 14/040,428, 52 pages.
Office Action dated Apr. 17, 2018 for U.S. Appl. No. 15/365,338, 42 pages.

* cited by examiner

PUBLIC/PRIVATE INDICATOR BASED ACCESS POINT CONNECTION PERMISSION

RELATED APPLICATION

The subject application is a continuation of, and claims priority to, U.S. patent application Ser. No. 15/365,338, filed 30 Nov. 2016, and entitled "PUBLIC/PRIVATE INDICATOR BASED ACCESS POINT CONNECTION PERMISSION," the entirety of which application is hereby incorporated by reference herein.

TECHNICAL FIELD

The disclosed subject matter relates to a determining permission related to allowing a user equipment to connect with an access point based on an indicator of the access point being a public or private resource.

BACKGROUND

By way of brief background, access points conventionally employ password based access permission. As such, in conventional systems, privately owned access points can be accessed by user equipment that has a correct password. Moreover, in conventional systems, where the private access point does not have a password enabled, nearly any user equipment can connect to the access point. These conventional systems can result in user equipment employing privately owned access points, which can result in a connected user equipment consuming resources via the access point that are not intended for public consumption. Moreover, in some regions, use of a resource via a privately owned access point, or in some cases, even connecting to a privately owned access point, without permission, can be illegal. As an example, where a user equipment is in a residential neighborhood, it can be illegal for the user equipment to connect to an open access point, e.g., an access point that does not have a password set to restrict access, where the access point is privately owned and permission has not been affirmatively granted for the user equipment to connect to the private access point. Moreover, a public access point, e.g., an access point intended to be available for public use, cannot easily be discerned from a private access point, more especially an open private access point, with conventional techniques.

DETAILED DESCRIPTION

Figure 1:
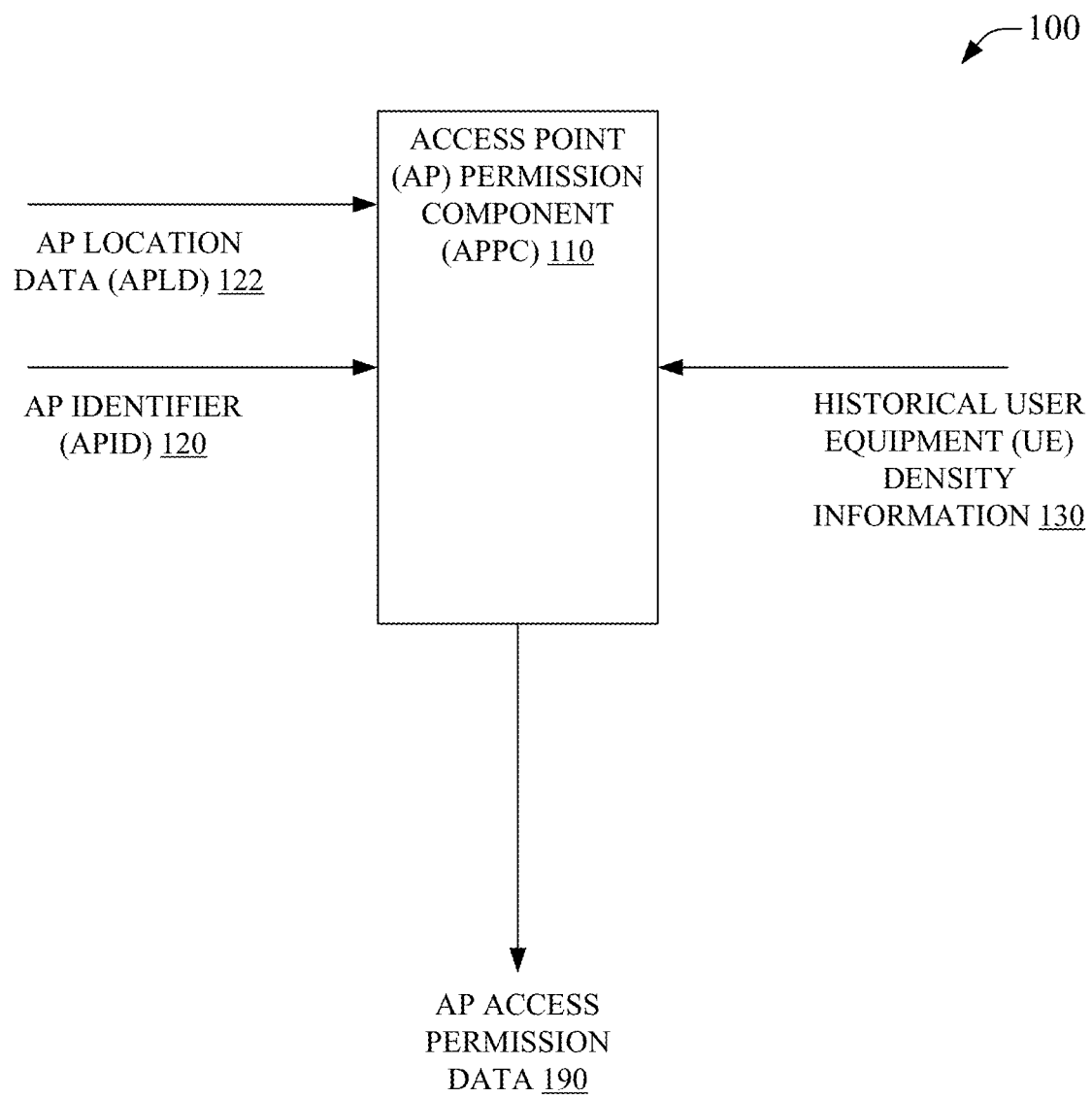
FIG. 1 is an illustration of an example system that facilitates determining a permission related to an indicator of a public/private access point status in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional access points (APs) typically employ password-based permissions to enable a user equipment (UE) to connect to the AP. As such, in conventional systems, privately owned APs, e.g., those owned by a private entity and intended solely for use by devices with permission form the private entity, can be accessed by user equipment that has a correct password or some other permission indicator. Where the private access point does not have a password enabled, nearly any user equipment can connect to the access point, including those without permission from the private entity. This can result in user equipment publically employing privately owned access points, which can result in a connected user equipment consuming resources via the private access point, e.g., public consumption without permission from the private entity. Moreover, in some regions, use of a resource via a privately owned AP, or in some cases, even connecting to a privately owned AP, without permission can be illegal. As an example, where a user equipment is in a residential neighborhood, it can be illegal for the user equipment to connect to an open AP, e.g., an AP that does not have a password set to restrict access, where the AP is actually a privately owned AP and permission has not been affirmatively granted for the user equipment to connect to the private AP. Moreover, a public AP, e.g., an access point intended to be available for public use, cannot easily be discerned from a private AP, more especially an open private AP, with conventional techniques. Determining a public/private status of an AP can be important to avoid unintended, and possibly illegal, connection to a private AP or access to a network resource via a private AP.

Observation of human behavior can suggest trends or patterns associated with deployment of public/private APs. In an aspect, a public AP, e.g., an access point intended for public use, can often be located proximate to a business, e.g., a coffee shop can provide an open public AP at the coffee shop for customer use or to draw in potential customers. As another counter example, it would be surprising to find a coffee shop AP located in a purely residential neighborhood distant from the coffee shop. As such, the geospatial information associated with an AP can be suggestive of the public/private status of the AP. This observation does not preclude the possibility that the coffee shop AP can be a private AP, e.g., the coffee shop AP can be intended for use only by customers of the coffee shop and not passersby that are not customers, the coffee shop AP can be for employee use only and not intended for customer use or other public use, etc. As such, other indicia suggestive of a public/private status of an AP can be important considerations.

In another aspect, user behavior can suggest that many public APs broadcast custom identifiers, e.g., a renamed service set identifier (SSID), etc. As an example, an AT&T store can provide a public AP that broadcasts an SSID of "AT&T OPEN WI-FI" rather than a generic default SSID set by the AP device manufacturer. As such, in an aspect, the disclosed subject matter can analyze AP identifiers to suggest a public or private AP character. Moreover, analysis of SSID naming by users can be performed to determine naming trends associated with a public/private AP status. Naming trends can be employed in generating a "white list" and/or "black list" related to a public/private AP status. In another aspect, the naming trends can be employed in ranking or inferring an AP status, with or without the use of white/black lists. As an example, a black list can comprise the term "private" such that any SSID including the term "private" is excluded from further consideration as a public AP, e.g., the SSID "AT&T OPEN WI-FI" could be considered public because it does not include the word "private" while the SSID "AT&T PRIVATE WI-FI" can be excluded as a public AP based on a blacklist including the word "private. White listing can operate similarly to the inclusion of an AP into an associated status. For example, where the term "open" is on a whitelist for public status, the SSID "AT&T OPEN WI-FI" can be determined to be a public AP based directly on the term "open" in the SSID and the white list. Furthermore, the terms can be employed in ranking APs, e.g., the term "personal" can decrease an AP rank in regard to public status, while term "free" can increase the rank of the AP, such that, for example, the SSID "FREE WI-FI" can be more highly ranked as a public AP than an AP broadcasting SSID "John's personal AP".

In some embodiments, both ranking and white/blacklisting can be performed. As an example, the SSID "MY PRIVATE FREE WI-FI" can be determined to have a private AP status based on the term "private" being included, e.g., the white/blacklist aspect can be controlling, but the SSID can also be ranked as more likely to be public than another SSID of "PRIVATE PERSONAL WI-FI," which incidentally by inclusion of the term "private" can also be determined to have a private AP status based on white/blacklisting. In environments with multiple SSIDs, the combination of ranking and white/blacklisting can provide a determined order of APs by public/private status. As an example, where the SSIDs are "open AP, free private AP, open free AP, and default SSID," the ranking can be, from most to least public character, "open free AP, open AP, default SSID, free private AP." This ordering can be based on "open free AP" comprising two terms that indicate public status, "open AP" having one term associated with public status, "free private AP" having a net zero public/private character (one private term and one public term), and "default SSID" having one term associated with private status. Moreover, the term "free" in the example can be used to classify public APs and the term "private" can be used to classify private APs, such that from most public to most private, the example order can be:

| Status relative to being Public AP | SSID |
|---|---|
| Public (due to use of "free" in SSID) | open free AP |
| +1 | open AP |
| −1 | default SSID |
| NOT Public (due to use of "private" in SSID) | free private AP |

In an aspect, the geospatial and AP identifier information can be employed in inferring or determining a status or ranked status of an AP. In an embodiment, rules can be applied to aid in discerning between public/private character. In some embodiments, rules can impose weighting in ranking or classifying APs. As an example, geospatial data, can included a location of an AP that is correlated with a known public retail store, this can be weighted more heavily than the AP SSID being named 'default SSID' and, as such, the AP can be determined to be public in character or can be ranked more highly in public character than private character. Moreover, in some embodiments historical UE density, e.g., a count of devices in an area for a determined period, can be a type of geospatial information. As such, historical UE density can be associated with a likelihood or probability that proximate APs are of a public/private status. As an example, a shopping mall can have several APs and a historically higher UE density than a residential neighborhood a few blocks away that also has several APs. The higher density of UEs in the region of the shopping mall can be employed to infer or determine that APs in the region of the shopping mall are more likely, or simply are, public in character, while the lower historical UE density in the residential area can be employed to suggest that APs in the residential area are private in character. Moreover, the historical UE density can be employed as a factor in determining public/private character, e.g., historical UE density, map data, supplementary data associated with a map/location, AP identifier, etc., can be combined in any combination to determine and/or infer a public/private AP status. As an example, the location of an AP in a historically UE dense area can be combined with supplementary information indicating that a restaurant occupies the same location as the AP, which can be combined with the SSID of the AP, to determine that the AP is likely a public AP. In this example, where SSID blacklisting is employed and the SSID includes, for example, the term "private," the AP can be indicated as having a private status despite other factors indicating that it is likely public.

In an aspect, the AP identifier analysis can be updated based on analysis of naming conventions in relation to public/private AP status. As such, the disclosed subject matter provides for a learning mode where, for example, real AP identifiers can be supplied and inferences can be trained to reflect real public/private AP status associated with the AP identifiers. In another aspect, analysis of naming conventions can generate terms that indicate public/private statuses, e.g., a university study can provide a list of terms often associated with public or private APs, which terms can be employed by the disclosed subject matter in white/blacklisting, ranking, etc.

In an aspect, map information/data, e.g., geospatial information, can be enriched with supplemental information, e.g., web searches, public records, etc. As an example, a location of an AP, e.g., determined from the AP itself, from a UE proximate to the AP, from a network provider map of the AP, etc., can be used to receive supplemental information, such as a web search of the latitude/longitude, address, etc., indicating that the location is associated with a museum, restaurant, shopping mall, grocery, coffee shop, fast food, municipal building, etc., which can be associated with a particular public/private character, or the location can be employed to access public records indicating a private party sale (residence), zoning information, etc., that can be associated with another public/private character. This supplemental information can, as disclosed herein, be employed in determining or inferring an AP status and/or a permission for a UE to access the AP.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which facilitates determining a permission related to an indicator of a public/private access point status in accordance with aspects of the subject disclosure. System 100 can include access point (AP) permission component (APPC) 110. APPC 110 can receive information and can determine a permission related to access to an AP. APPC 110 can enable access to the permission in the form of AP access permission data 190. AP access permission data 190 can be employed, for example, by a user equipment (UE) to enable/disable access to an AP to reduce a likelihood of accessing a non-public AP without permission.

APPC 110 can receive AP identifier (APID) 120. APID 120 can, in some embodiments be an SSID for a Wi-Fi network. In some embodiments, APID 120 can comprise other identification information for an AP connection, e.g., a Bluetooth connection, etc. In an aspect, an SSID can be a default SSID, e.g., as set by the AP manufacturer, or can be a user selected SSID, e.g., a customized SSID value. The SSID can be employed in determining a public/private character of the associated AP connection. In an aspect, the SSID can be parsed to determine keywords comprising the SSID value, for example, an SSID of "ABC company public hotspot" can be parsed to capture keywords such as "public," which can then be used to infer or determine a public/private character of the associated SSID connection. Determining the public/private character of the AP connection can comprise whitelist, blacklist, ranking, etc. Continuing the previous example, the use of "public" in the SSID can rank the AP connection as more likely public, can be classified as public based on a whitelist of public AP terms, can be classified as public based on a blacklist of private AP terms, etc. In a further aspect, white/blacklisting can be combined with ranking, e.g., APs can be ranked and certain terms can be used to move an AP to the top or bottom of a ranking, e.g., certain terms can affect rank more substantially than other terms, certain terms can be used to fully escalate, or de-escalate, a rank of an AP, etc. As an example, rankings of APs from 1 to 5, where 1 indicates public, 3 indicates undetermined, and 5 indicates private, can rank "ABC company public hotspot" as a 1 based on inclusion of the term "public," while the SSID "ABC company hotspot" can be ranked as 2 for being a non-default name but not including the term "public," e.g., the ranked can be incremented from 3 to 2 based on the use of a non-default SSID name. In an aspect, the keywords used by APPC 110 can be updated to reflect relevant AP identification trends.

APPC 110 can further receive AP location data (APLD) 122. APLD 122 can reflect a location of an AP. In an aspect, AP location information can be associated with a location of a UE. As an example, a UE can provide APLD 122 by sending the UE location data, which can be treated as the AP location. In another aspect, AP location can be known, e.g., defined by a user, mapped by a network provider, the AP can self-locate, e.g., the AP can comprise a GPS, etc., and communicated as APLD 122 to APPC 110. As an example, APID 120 can identify an AP that has previously had a location reported, e.g., APLD 122, to APPC 110, such that APPC 110 can look up the previously reported AP location based on the currently received APID 120.

In some embodiments, APLD 122 can be employed in determining supplemental information about the associated AP. As an example, an AP can be associated with APLD 122 indicating an address, such that the address can be used to look up business licenses. Where a business license is associated with the lookup address, this can affect determinations of, or inference relating to, a public/private status of the AP.

In some embodiments, APLD 122 can be employed in determining a location of an AP with regard to historical UE densities in an area, e.g., a count of UEs in the area for a given period. A historical density of UEs can be associated with a public/private character of an AP. As an example, a popular restaurant can be associated with a higher count of UEs in the area of the restaurant for a given evening that can be associated with a private residence for the same period. Based on this association, higher historical UE densities can be more likely to be proximate to public-type APs. In an aspect, a 'heat map' analysis can be overlaid with a map of a region to illustrate areas of higher historical UE density, which can, in some embodiments, be associated with an increased likelihood that APs in 'hot' areas are public, while APs in 'cool' areas are private.

Accordingly, APPC 110 can receive historical UE density information 130. In an aspect, APPC 110 can employ historical UE density information 130 in combination with APLD 122 to determine or infer a public/private AP status. In some embodiments, this can be combined with APID 120 keyword analysis. As such, APPC 110 can generate AP access permission data 190 based on historical UE density information 130, APLD 122 and APID 120. AP access permission data 190 can comprise an inference related to a public/private AP status, a ranking of APs based on a likelihood of public/private AP status, etc. AP access permission data 190 can be employed by other devices to determine if a connection to an AP should be initiated based on the public/private AP status. This can aid in reducing a likelihood of a device initiating a connection to a private AP without permission.

Figure 2:
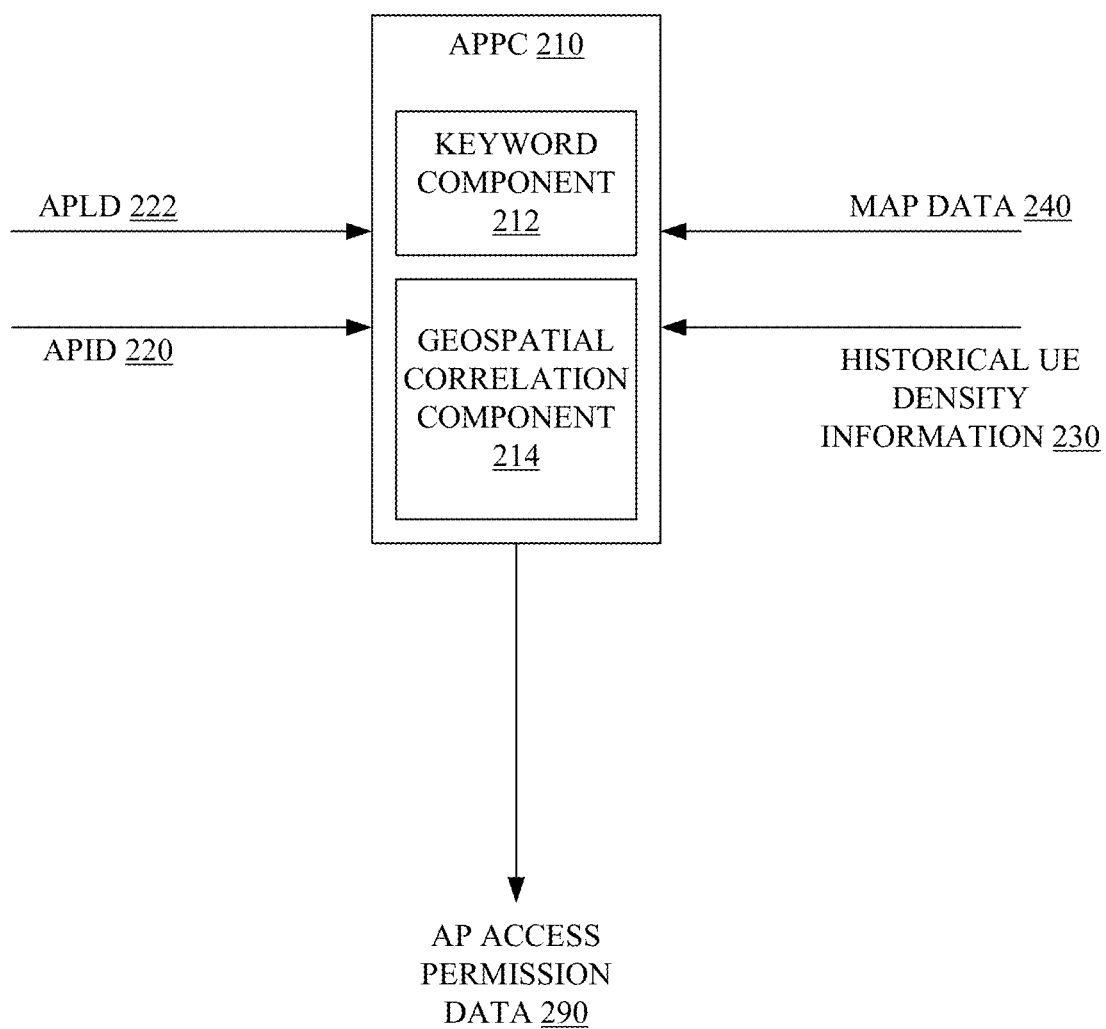
FIG. 2 is a depiction of an example system that facilitates determining a permission related to an indicator of a public/private access point status based on a keyword and geospatial information in accordance with aspects of the subject disclosure.

FIG. 2 is a depiction of a system 200 that can facilitate determining a permission related to an indicator of a public/private access point status based on a keyword and geospatial information in accordance with aspects of the subject disclosure. System 200 can include APPC 210. APPC 210 can receive information and can determine a permission related to access to an AP. APPC 210 can enable access to the permission in the form of AP access permission data 290. AP access permission data 290 can be employed, for example, by a UE to enable/disable access to an AP to reduce a likelihood of accessing a non-public AP without permission.

APPC 210 can receive APID 220. APID 220 can, in some embodiments be an SSID for a Wi-Fi network. In some embodiments, APID 220 can comprise other identification information for an AP connection, e.g., a Bluetooth connection, etc. In an aspect, an SSID can be a default SSID, e.g., as set by the AP manufacturer, or can be a user selected SSID, e.g., a customized SSID value. The SSID can be employed in determining a public/private character of the associated AP connection. In an aspect, the SSID can be parsed to determine keywords comprising the SSID value, which can then be used to infer or determine a public/private character of the associated SSID connection.

APPC 210 can comprise keyword component 212. Keyword component 212 can enable keyword analysis of APID 220. In an aspect, keyword component 212 can comprise a list of terms. The list of terms can be updateable. The list of terms can be compared to keywords parsed from APID 220 to aid in determining the public/private character of the AP connection, e.g., whitelisting, blacklisting, ranking, etc. In an aspect keyword component 212 can enable comparison of keywords against a list of terms. In a further aspect, keyword component 212 can enable truncation and/or adaptation of terms or parsed elements of APID 220, e.g., enabling comparisons with root words, wildcards, etc. As an example, the SSID "MyPrivAP" can be parsed in to "my" "priv" and "AP", wherein "priv" can be determined to be a truncated form of the term "private" such that the AP can be determined to more likely private in character based on this factor. As another example, the SSID "PRIVATISH" can be treated as the term 'privat?? . . . ?' where the "?" represents wildcard values, such that "PRIVATISH" can be interpreted as comprising the term 'private' and the character of the AP can be subsequently determined or inferred accordingly. In an aspect, white/blacklisting can be combined with ranking, e.g., APs can be ranked and certain terms can be used to move an AP to the top or bottom of a ranking. In an aspect, the keywords used by APPC 210 can be updated to reflect relevant AP identification trends.

APPC 210 can further comprise geospatial correlation component 214. Geospatial correlation component 214 can correlate geospatial information related to an AP. In an aspect, geospatial correlation component 214 can receive a map or map data, e.g., map data 240, etc., receive AP location information, e.g., APLD 222, etc., receive supplemental map data, etc. Geospatial correlation component 214 can correlate the received information to facilitate determining or inferring public/private AP status. As an example, geospatial correlation component 214 can receive APID 220, which geospatial correlation component 214 can employ to access a previously indicated location of the associated AP, and can then determine a public/private character based on historical UE density for the previously indicated location associated with the AP. Expanding the example, the public/private character of the AP can be further based on map data 240, supplemental map data, APLD 222, etc.

APPC 210 can receive APLD 222. APLD 222 can reflect a location of an AP. In an aspect, AP location information can be associated with a location of a UE. In another aspect, AP location can be known and communicated as APLD 222 to APPC 210. In some embodiments, APLD 222 can be employed in determining supplemental information about the associated AP. In some embodiments, APLD 222 can be employed in determining a location of an AP with regard to historical UE densities in an area, e.g., a count of UEs in the area for a given period. A historical density of UEs can be associated with a public/private character of an AP. In an aspect, a 'heat map' analysis can be overlaid with a map of a region to illustrate areas of higher historical UE density, which can, in some embodiments, be associated with an increased likelihood that APs in 'hot' areas are public, while APs in 'cool' areas are private.

Map data 240 can be received by APPC 210. Map data 240 can comprise nearly any type of map information, for example, traffic map data, geographic map data, population density data, land use zoning data, roadway data, etc. Map data can be combined with APLD 222 to provide additional insight into the public/private nature of an AP. As an example, APLD 222 can indicate a first location, the first location can be identified in a commercially zoned region based on land use zoning data from map data 240, such that APs at the first location can be inferred to be more likely associated with a commercial business than a private residence. This factor can then be combined with other factors in inferring or determining a public/private AP status. Continuing the example, where the APID 220 for an AP in the commercial district has an SSID "NON_PUBLIC AP," this AP can be determined to be private despite being in the commercial zone, while in contrast, an SSID "default_SSID" can be inferred to more likely be a public AP based on the default name and the location in the commercial zone.

Further, APPC 210 can receive historical UE density information 230. In an aspect, APPC 210 can employ historical UE density information 230 in combination with APLD 222 to determine or infer a public/private AP status. In some embodiments, this can be combined with APID 220 keyword analysis and/or map data 240. As such, APPC 210 can generate AP access permission data 290 based on historical UE density information 230, map data 240, APLD 222 and/or APID 220. AP access permission data 290 can comprise an inference related to a public/private AP status, a ranking of APs based on a likelihood of public/private AP status, etc. AP access permission data 290 can be employed by other devices to determine if a connection to an AP should be initiated based on the public/private AP status. This can aid in reducing a likelihood of a device initiating a connection to a private AP without permission.

Figure 3:
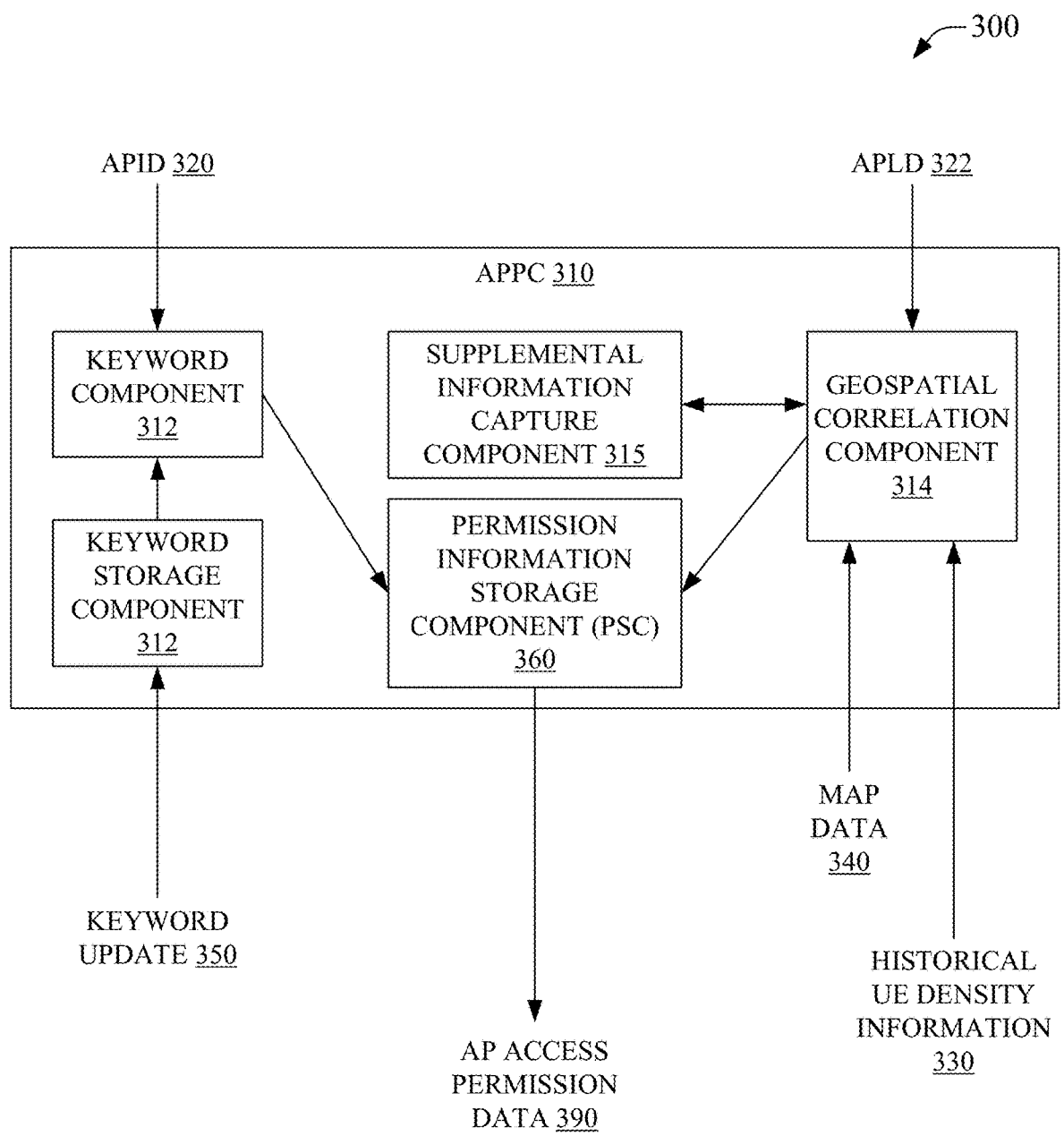
FIG. 3 illustrates an example system that facilitates determining a permission related to an indicator of a public/private access point status based on an updateable keyword and supplementary information related to geospatial information in accordance with aspects of the subject disclosure.

FIG. 3 illustrates a system 300 that facilitates determining a permission related to an indicator of a public/private access point status based on an updateable keyword and supplementary information related to geospatial information in accordance with aspects of the subject disclosure. System 300 can comprise include APPC 310. APPC 310 can receive information and can determine a permission related to access to an AP. APPC 310 can enable access to the permission in the form of AP access permission data 390. AP access permission data 390 can be employed, for example, by a UE to enable/disable access to an AP to reduce a likelihood of accessing a non-public AP without permission.

APPC 310 can comprise keyword component 312. Keyword component 312 can enable keyword analysis of APID 320. APPC 310 can receive APID 320 at keyword component 312. APID 320 can, in some embodiments be an SSID for a Wi-Fi network. In some embodiments, APID 320 can comprise other identification information for an AP connection. In an aspect, an SSID can be a default SSID or can be a user selected SSID. The SSID can be employed in determining a public/private character of the associated AP connection.

In an aspect, the SSID can be parsed, e.g., via keyword component 312, to determine keywords comprising the SSID value, which can then be used to infer or determine a public/private character of the associated SSID connection. In an aspect, keyword component 312 can comprise a list of terms. The list of terms can be updateable. The list of terms can be compared to keywords parsed from APID 320 to aid in determining the public/private character of the AP connection, e.g., whitelisting, blacklisting, ranking, etc. In an aspect, keyword component 312 can enable comparison of keywords against a list of terms. In a further aspect, keyword component 312 can enable truncation and/or adaptation of terms or parsed elements of APID 320. In an aspect, white/blacklisting can be combined with ranking, e.g., APs can be ranked and certain terms can be used to move an AP to the top or bottom of a ranking.

In an aspect, the keywords used by APPC 310 can be updated to reflect relevant AP identification trends. Keywords can be stored in APPC 310 via keyword storage component 312. Keyword storage component 312 can be updated via keyword update 350. In an aspect, the analysis of keywords can be updated based on analysis of naming conventions in relation to public/private AP status. As such, APPC 310 can employ a learning mode where, for example, real AP identifiers can be supplied and inferences can be trained to reflect real public/private AP status associated with the AP identifiers. In another aspect, analysis of naming conventions can generate terms that suggest or indicate public/private AP status, e.g., a list of terms often associated with public or private APs, which terms can be stored in keyword storage component 312 so that they can be employed by keyword component 312 in white/blacklisting, ranking, etc. parsed terms from APID 320.

APPC 310 can further comprise geospatial correlation component 314. Geospatial correlation component 314 can correlate geospatial information related to an AP. In an aspect, geospatial correlation component 314 can receive a map or map data, e.g., map data 340, etc., receive AP location information, e.g., APLD 322, etc., receive supplemental map data, etc. Geospatial correlation component 314 can correlate the received information to facilitate determining or inferring public/private AP status. As an example, geospatial correlation component 314 can receive APID 320, which geospatial correlation component 314 can employ to access a previously indicated location of the associated AP, and can then determine a public/private character based on historical UE density for the previously indicated location associated with the AP. Expanding the example, the public/private character of the AP can be further based on map data 340, supplemental map data, APLD 322, etc.

APPC 310 can receive, at geospatial correlation component 314, APLD 322. APLD 322 can reflect a location of an AP. In an aspect, AP location information can be associated with a location of a UE. In another aspect, AP location can be known and communicated as APLD 322 to APPC 310. In some embodiments, APLD 322 can be employed in determining supplemental information about the associated AP. In some embodiments, APLD 322 can be employed in determining a location of an AP with regard to historical UE densities in an area, e.g., a count of UEs in the area for a given period. A historical density of UEs can be associated with a public/private character of an AP. In an aspect, a 'heat map' analysis can be overlaid with a map of a region to illustrate areas of higher historical UE density, which can, in some embodiments, be associated with an increased likelihood that APs in 'hot' areas are public, while APs in 'cool' areas are private.

Map data 340 can be received by geospatial correlation component 314 via APPC 310. Map data 340 can comprise nearly any type of map information, for example, traffic map data, geographic map data, population density data, land use zoning data, roadway data, etc. Map data can be combined with APLD 322 to provide additional insight into the public/private nature of an AP via supplemental information capture component 315. As an example, APLD 322 can indicate a first location, the first location can be identified in a commercially zoned region based on land use zoning data from map data 340, and subsequently identified as located at a clothing store in the commercial zone by looking up the address on the Internet via supplemental information capture component 315, such that APs at the first location can be inferred to more likely be associated with the clothing store than a private residence that might be located in the same area of the commercial zone. This factor can then be combined with other factors in inferring or determining a public/private AP status. Continuing the example, where the APID 320 for an AP of the clothing store has an SSID "Employee Only AP," this AP can be determined to be private despite being located in the clothing store, while in contrast, an SSID "default_SSID" can be inferred to more likely be a public AP based on the default name and the location in the clothing store. Supplemental information capture component 315 can be instructed to gather supplemental data relating to APLD 322, map data 340, historical UE density information 330, etc., from nearly any public or private source. As an example, supplemental information capture component 315 can access $3^{rd}$ party paid database(s), governmental land tax data, utility company data, aerial photographs, etc., to gather supplemental information. In some embodiments, not illustrated, supplemental information capture component 315 can further employ APID 320 to gather supplemental information, for example, a registry of APs that is updated by AP users with public/private AP statuses.

Further, APPC 310 can receive, at geospatial correlation component 314, historical UE density information 330. In an aspect, APPC 310 can employ historical UE density information 330 in combination with APLD 322 to determine or infer a public/private AP status. In some embodiments, this can be combined with APID 320 keyword analysis and/or map data 340. As such, APPC 310 can generate AP access permission data 390 based on historical UE density information 330, map data 340, APLD 322 and/or APID 320.

APPC 310 can store permission information at permission information storage component (PSC) 360. PSC 360 can act as a repository for determined permissions, e.g., associated with APID 320. PSC 360 can source AP access permission data 390, which can comprise an inference related to a public/private AP status, a ranking of APs based on a likelihood of public/private AP status, etc. AP access permission data 390 can be employed by other devices to determine if a connection to an AP should be initiated based on the public/private AP status. This can aid in reducing a likelihood of a device initiating a connection to a private AP without permission. In an aspect, PSC 360 can further facilitate access to historical, e.g., previously determined, permission information. As such, rather than re-determine a public/private status for an AP identified by APID 320, APID 320 can be employed by APPC 310, via PSC 360, to enable access, e.g., as AP access permission data 390, to previously determined AP permission information. APPC 310 can determine if permission information store in PSC 360 is stale, e.g., out of date, too old, based on faulty information, based on less than all available information, etc. Where the permission information on PSC 360 related to APID 320 is stale, APPC 310 can determine or infer the public/private AP status as disclosed hereinabove. Where the permission information is not stale, APPC 310 can employ the stored permission information at PSC 360 rather than re-determining the permission information. In an aspect, even where data is not stale, a redetermination can be made. As an example, where the data on PSC 360 is not stale, but APPC 310 is not heavily loaded with queries, APPC 310 can re-determine AP access permission data 390 and update the data stored on PSC 360. As another example, where the data stored on PSC 360 is recently stale, but APPC 310 is heavily loaded, the stale information, in some instances, can be used as AP access permission data 390. In this example, other factors can be considered before using stale data, for example, a history of the AP associated with APID 320 being of a first AP status, an expected lead time to re-determine permission information, how stale the stored data is, etc. Continuing the example, where the data is only slightly stale, the AP character for the last 100 determinations has always been of a public type, and the APPC is heavily loaded, APPC 310 can provide the stale data from PSC 360 as AP access permission data 390. One or more stale data rules can be employed to determine if stale data is used, if non-stale data is used, if APPC 310 re-determines AP access permission data 390, etc.

Figure 4:
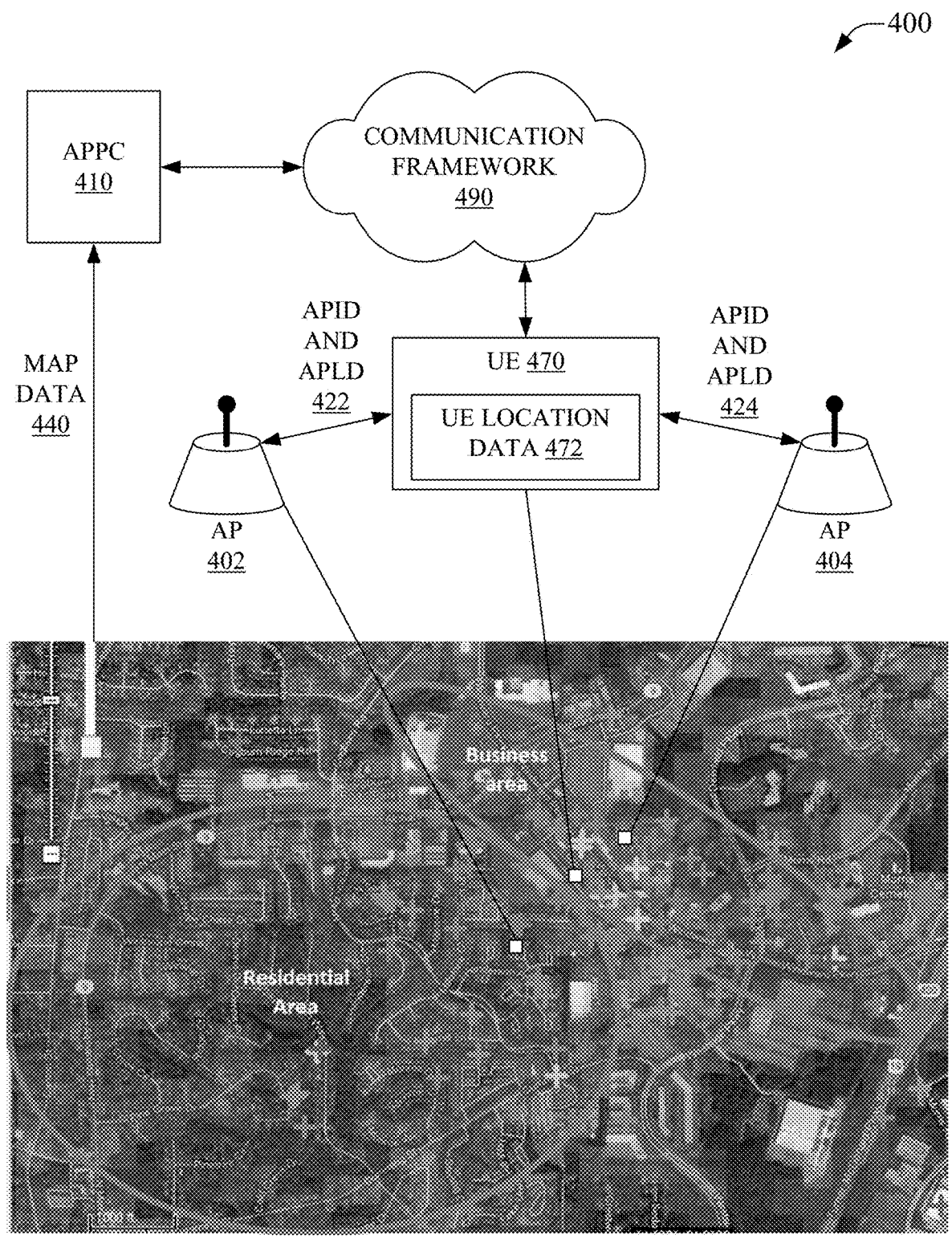
FIG. 4 illustrates an example system that facilitates determining a permission related to an indicator of a public/private access point status based on map information and user equipment location information in accordance with aspects of the subject disclosure.

FIG. 4 illustrates a system 400 that facilitates determining a permission related to an indicator of a public/private access point status based on map information and user equipment location information in accordance with aspects of the subject disclosure. System 400 can include APPC 410. APPC 410 can receive information and can determine a permission related to access to an AP. APPC 410 can enable access to the permission in the form of AP access permission data 490. AP access permission data 490 can be employed, for example, by UE 470 to enable/disable access to an AP, e.g., AP 402, 404, etc., to reduce a likelihood of accessing a non-public AP without permission. In an aspect, APPC 410 can be located remotely from UE 470 and/or AP 402, 404, etc. APPC 410 can be communicatively coupled to UE 470 via communications framework 490, e.g., a network comprising a wired and/or wireless link.

APPC 410 can receive map data 440, e.g., representing the aerial image in FIG. 4. APPC 410 can further receive APID and APLD, e.g., 422 and 424, related to AP 402 and 404 respectively, via UE 470. APID of 422, 424, etc., can, in some embodiments be an SSID for a Wi-Fi network. In some embodiments, APID of 422, 424, etc., can comprise other identification information for an AP connection, e.g., a Bluetooth connection, etc. In an aspect, an SSID can be a default SSID, e.g., as set by the AP manufacturer, or can be a user selected SSID, e.g., a customized SSID value. The SSID can be employed in determining a public/private character of the associated AP connection. In an aspect, the SSID can be parsed to determine keywords comprising the SSID value, which can then be used to infer or determine a public/private character of the associated SSID connection. APLD of 422, 424, etc., can reflect a location of an AP. In an aspect, AP location can be known and communicated as APLD of 422, 424, etc., to APPC 410. In some embodiments, APLD of 422, 424, etc., can be employed in determining supplemental information about the associated AP. In some embodiments, APLD of 422, 424, etc., can be employed in determining a location of an AP with regard to historical UE densities in an area, e.g., a count of UEs in the area for a given period.

In an embodiment, an AP location can be based on a location of a UE. Where a UE is proximate to an AP, e.g., sufficiently close to be in the service area of the AP, the location of the UE can be considered accurate enough to also represent the location of the AP. As such, UE location data 472 can be substituted from APLD of 422, 424, etc., in some circumstances, e.g., where the location of the AP is otherwise not known, etc. As illustrated in FIG. 4, where UE 470 is located proximate to and between AP 402 an AP 404, the UE location can be used as the AP location. It will be noted however, that the actual locations of the APs, e.g., 402 and 404, are not the same as the UE location and can result in different permission results. For example, where AP 402 employs accurate APLD information, it can be determined to be in the residential area, while if AP 402 uses UE 470 location as the location of AP 402, it will indicate that UE 402 is located in the business area. This can contrast with AP 404, which will show as being located in the business area for both an accurate location of AP 404 as well as when substituting the UE location for the location of AP 404. As such, based on location substitution rules, a UE location can be substituted in certain conditions, e.g., where a location for an AP is not otherwise available, where a location of a UE is determined to be better than an otherwise available location of an AP, etc. As an example, where a UE uses a radio access technology known to have a small coverage area, such as near field communication, etc., a location substitution rule can indicate that it is acceptable to substitute the UE location where it is expected to be more accurate than an otherwise available location for the AP.

Figure 5:
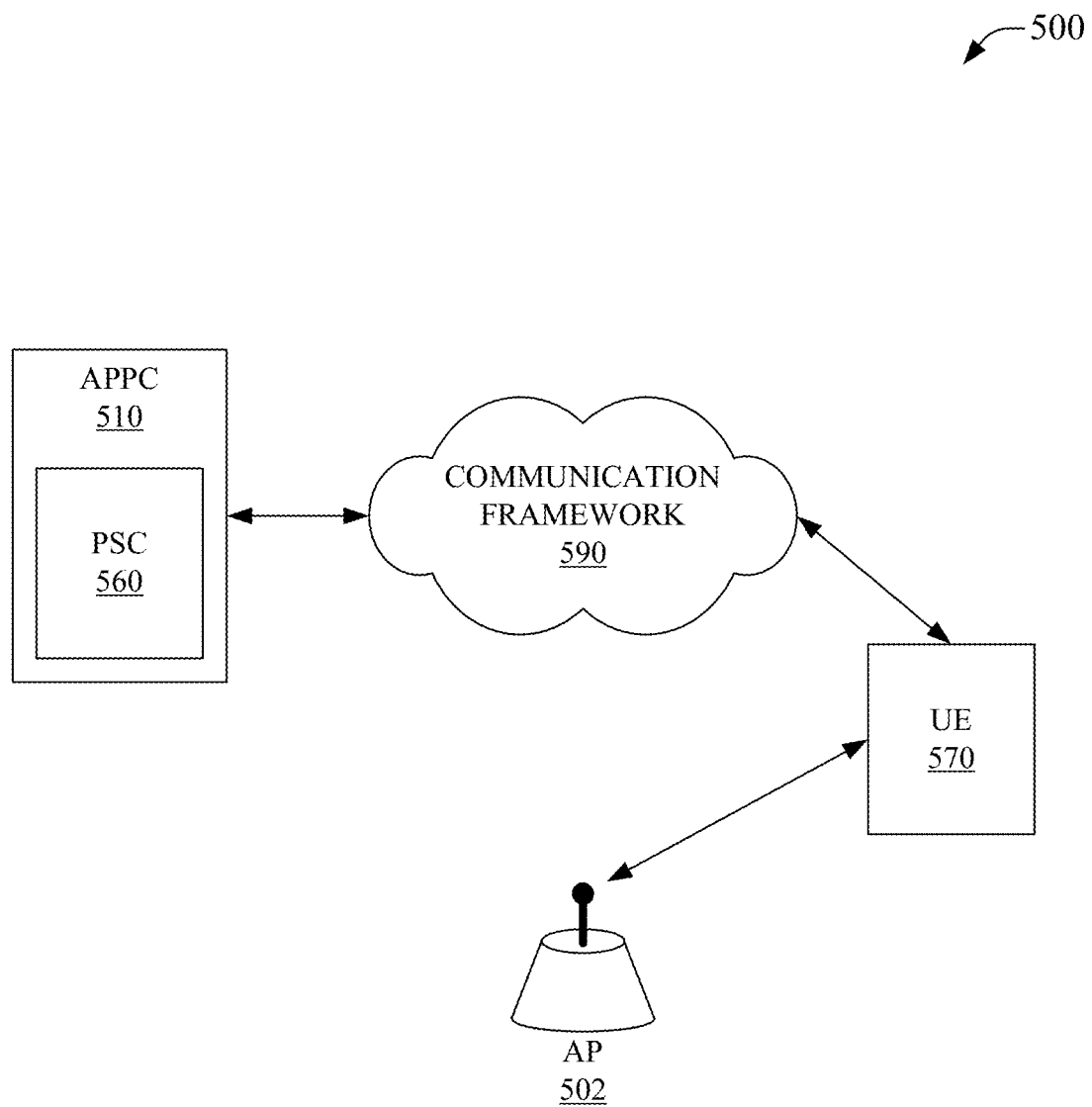
FIG. 5 illustrates an example system facilitating determining a permission related to an indicator of a public/private access point status based on stored permission information in accordance with aspects of the subject disclosure.

FIG. 5 illustrates a system 500 that facilitates determining a permission related to an indicator of a public/private access point status based on stored permission information in accordance with aspects of the subject disclosure. System 500 can comprise APPC 510. APPC 510 can receive information and can determine a permission related to access to an AP, e.g., AP 502. APPC 510 can enable access to the permission in the form of AP access permission data, e.g., 190, 290, 390, 490, etc. AP access permission data can be employed, for example, by UE 570 to enable/disable access to AP 502 to reduce a likelihood of accessing a non-public AP without permission.

APPC 510 can comprise PSC 560. PSC 560 can act as a repository for determined permissions, e.g., associated with an identified AP, e.g., AP 502. PSC 560 can enable access to AP access permission data, which can comprise an inference related to a public/private AP status, a ranking of APs based on a likelihood of public/private AP status, etc. AP access permission data can be employed by other devices, e.g., UE 570, etc., to determine if a connection to an AP, e.g., AP 502, etc., should be initiated based on the public/private AP status. This can aid in reducing a likelihood of a device initiating a connection to a private AP without permission. In an aspect, PSC 560 can further facilitate access to historical, e.g., previously determined, permission information. This can reduce instances where a public/private status for AP 502 is re-determined. PSC 560 can enable access to previously determined AP permission information for AP 502. In an aspect, APPC 510 can determine if permission information stored in PSC 560 is stale, e.g., out of date, too old, based on faulty information, based on less than all available information, etc. Where the permission information stored on PSC 560 is stale, APPC 510 can determine or infer the public/private AP status for AP 502 as disclosed herein.

Where the permission information is not stale, APPC 510 can employ the stored permission information from PSC 560 rather than re-determining the permission information. In some embodiments, even where data is not stale, a redetermination can be made. In some embodiments, where the data is stale, other factors can be considered that can enable use of the stale data. As an example, a stable AP state history of AP 502 can be determined to be sufficient to re-use stale data from PSC 560 rather that to re-determine the AP state. One or more stale data rules can be employed to determine if stale data is to be used, if non-stale data is to be used, if APPC 510 will re-determine AP access permission data for AP 502, etc.

APID can be communicated, vie UE 570 and communication framework 590, to APPC 510. APID from AP 502 can be parsed into keywords. Keyword analysis of the APID, for example, of an SSID for a Wi-Fi network, can be employed in determining a public/private character of the associated AP connection. In an aspect, a list of keyword terms used in analysis of the APID parse can be updateable. The list of terms can be compared to parsed keywords to aid in determining the public/private character of the AP connection, e.g., whitelisting, blacklisting, ranking, etc. In a further aspect, keywords can be truncated and/or adapted, .e.g., root words of terms, wildcards, etc. In an aspect, white/black-listing can be combined with ranking, e.g., APs can be ranked and certain terms can be used to move an AP to the top or bottom of a ranking.

Figure 6:
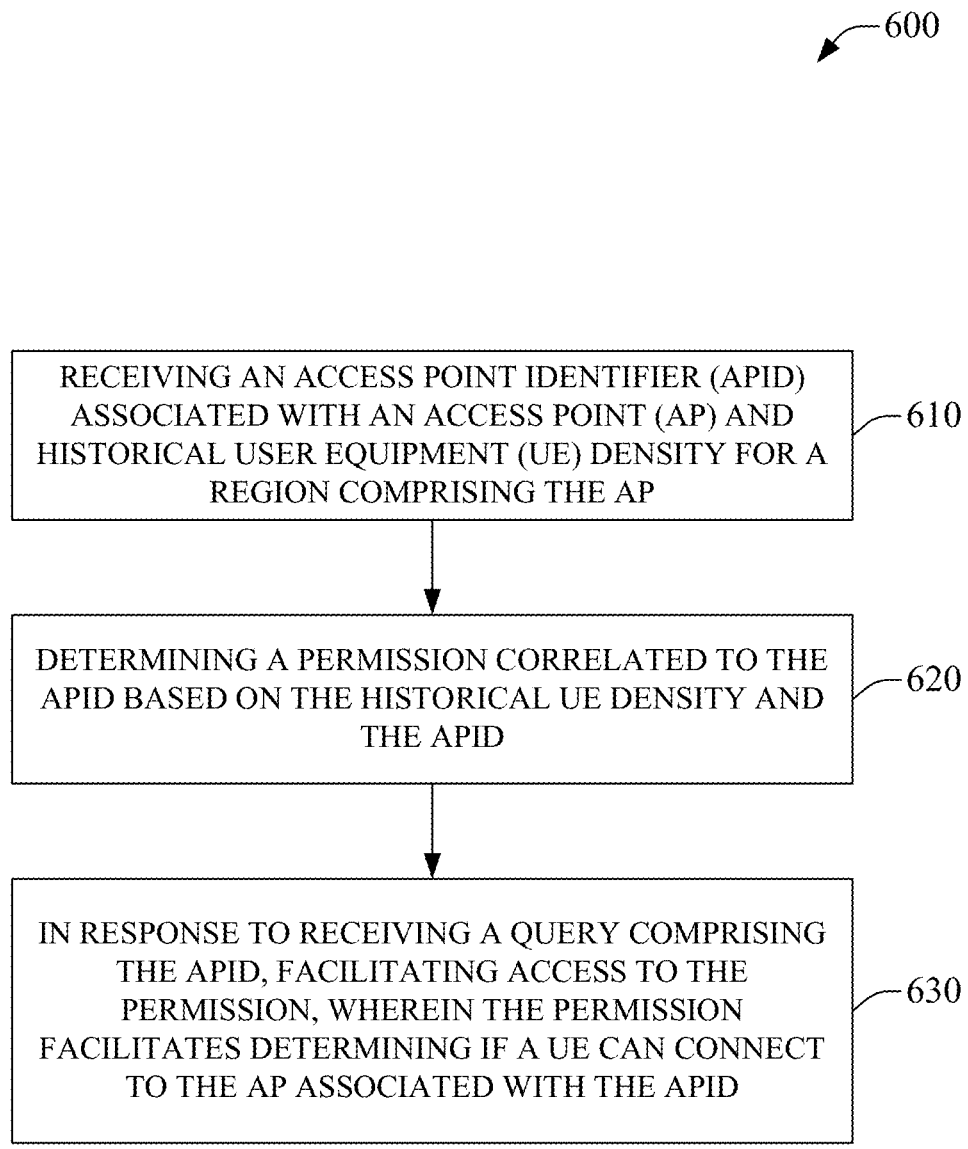
FIG. 6 illustrates an example method facilitating determining a permission related to an indicator of a public/private access point status in accordance with aspects of the subject disclosure.
Figure 7:
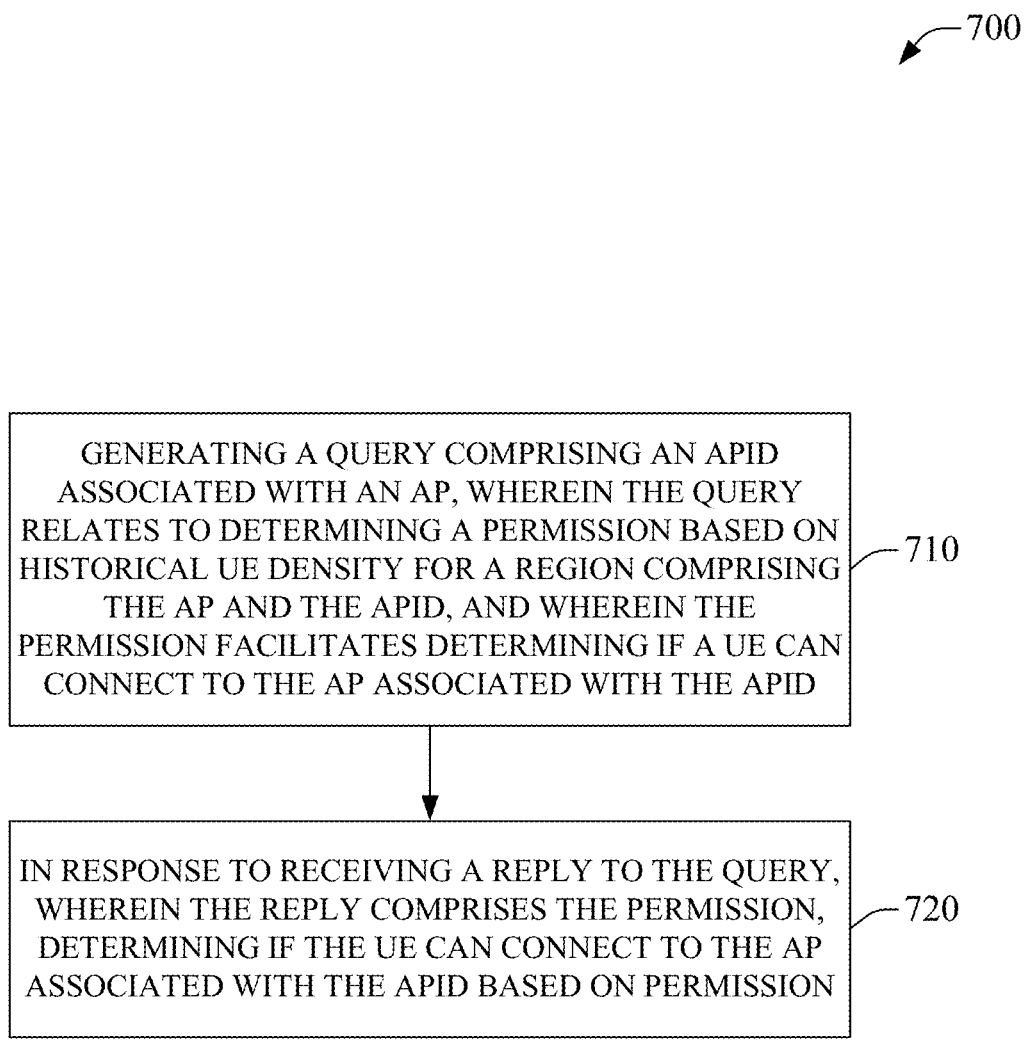
FIG. 7 depicts an example method facilitating receiving by a user equipment, in response to a query from the user equipment, a permission related to an indicator of a public/private access point status in accordance with aspects of the subject disclosure.
Figure 8:
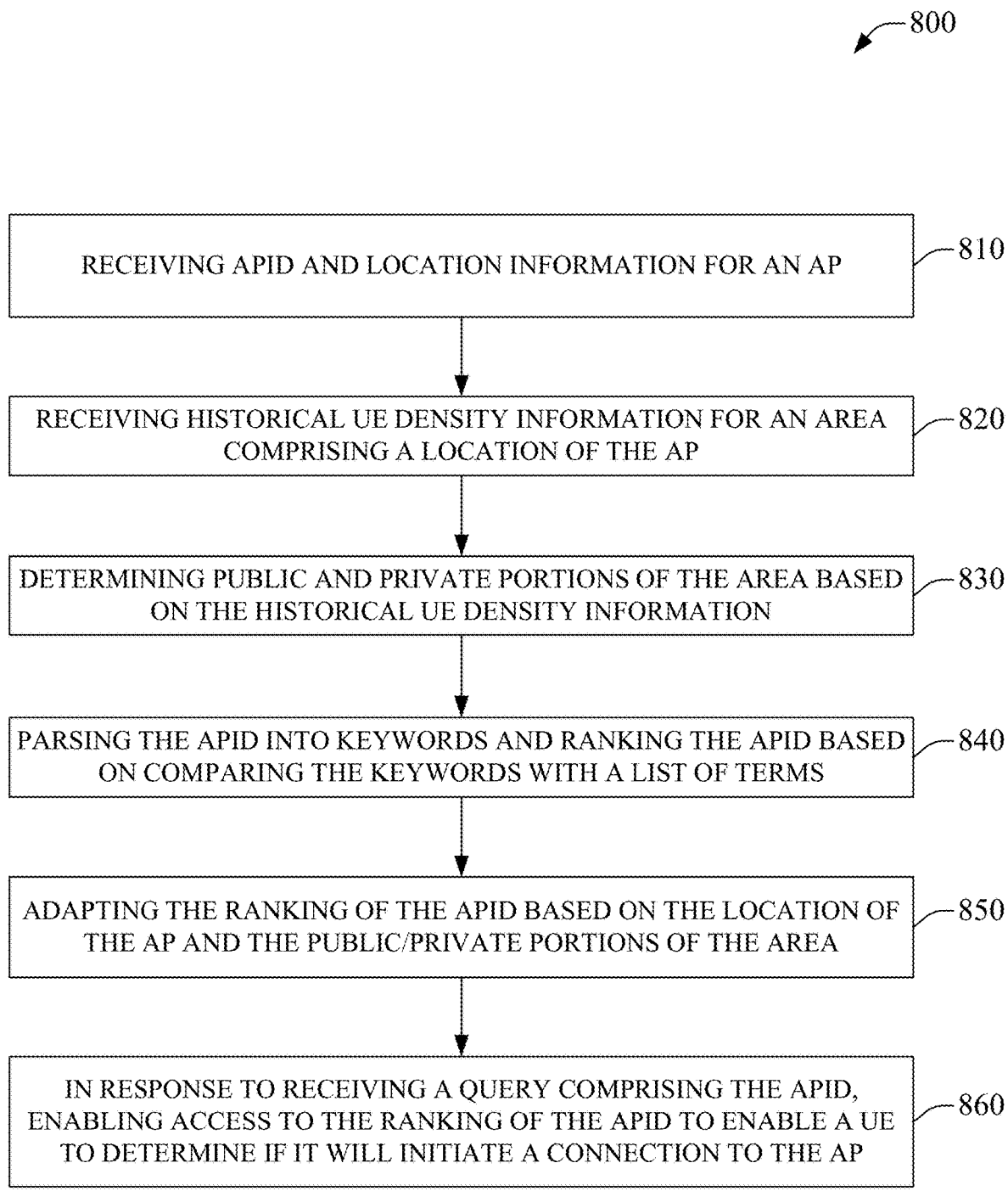
FIG. 8 illustrates an example method facilitating determining a permission related to an indicator of a public/private access point status based on a keyword and map data in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 facilitating determining a permission related to an indicator of a public/private access point status in accordance with aspects of the subject disclosure. At 610, method 600 can comprise receiving an access point identifier (APID) associated with an access point (AP). At 610, method 600 can further comprise receiving historical user equipment (UE) density information for a region comprising the AP. In some embodiments the APID can be an SSID, Bluetooth ID, etc. The APID can be a default APID, e.g., set by the AP manufacturer, etc., or can be a custom APID, e.g., an APID set by a user, etc., for example a user selected SSID. The APID, or portions thereof, can be compared to terms that are associated with public APs or private APs. As an example, where the term 'open' is determined to be used most frequently in APIDs for publicly accessible APs, the term 'open' when found in an APID can be indicative of the associated AP being a publicly accessible AP. APID analysis can enable ranking, whitelisting, blacklisting, etc., of APIDs and associated APs.

In an aspect, historical UE density, e.g., a count of UEs in an area for a period, can be correlated to public/private AP states. As an example, it can be less common for high counts of UEs to be in an area that is not public. While this can occur, for example, a private vacation resort can be non-public and still be associated with a high UE density, it is generally more common for areas like shopping malls, grocery stores, sporting events, etc., that are generally public to be associated with high UE densities. Moreover, public areas can correspond to public AP resources. As before, public areas can comprise private APs, but often can comprise public APs. As such, correlations between historical UE density and public AP character can be employed as a factor in determining a permission related to allowing UE to connect to an AP.

At 620, method 600 can comprise determining a permission correlated to the APID. The permission can be based on the historical UE density and the APID, e.g., analysis of the APID for keyword terms. As an example, where the AP is located in a historically dense UE area, this can more commonly be associated with a public AP character. Similarly, where the APID comprises a term associated with a public AP character, the combination of the APID and historical UE density can lead to a determination or inference that the AP is a public AP and the permission can be determined accordingly. As another example, where the AP is located in a low-density area and the APID comprises terms indicating a private AP, e.g., "joe's private Wi-Fi", etc., the permission can be associated with a private AP character. Moreover, where the historical UE density and APID analysis can be factors contributing to ranking of APs, the AP can be ranked as more private or more public in comparison to other APs in the area. Furthermore, certain terms in the APID analysis can be employed to designate an AP as private or public regardless of other factors. As such, where the APID comprises a term, for example, "public library," even where the AP is located in a low UE density area, the permission can correspond to a public AP character.

At 630, access to the permission can occur in method 600. The access can occur in response to receiving a query comprising the APID. The permission can facilitate demining if a UE can connect to the AP associated with the APID. At this point, method 600 can end. As an example, method 600 can receive a query from a UE, wherein the query identified the AP, e.g., the query includes the APID. In response, method 600 can facilitate access to the permission determined at 620. The permission can then be employed, for example, by the UE to determine if the AP is public/private, e.g., if the UE can connect to the AP associated with the APID. Where an AP is private, the permission can facilitate determining that the UE should not connect to the AP. In contrast, where the AP is public, the permission can facilitate determining that the UE can connect to the AP.

FIG. 7 illustrates a method 700 that facilitates receiving by a user equipment, in response to a query from the user equipment, a permission related to an indicator of a public/private access point status in accordance with aspects of the subject disclosure. At 710, method 700 can comprise generating a query comprising an APID associated with an AP. As an example, a UE can move into a coverage area of an AP and can observe the APID, e.g., a SSID for a Wi-Fi AP. The example UE can then generate a query with the APID to check if the AP is public or private. The query can relate to determining a permission based on historical UE density for a region comprising the AP and analysis of the APID itself. The permission can facilitate determining if a UE can connect to the AP associated with the APID.

At 720, method 700 can comprise, in response to receiving a reply to the query, wherein the response comprises the permission, determining if the UE can connect to the AP associated with the APID based on the permission. At this point, method 700 can end. The response to the query generated at 710 can comprise a permission. The permission can be based on the APID, or portions thereof, which can be compared to terms that are associated with public APs or private APs. As an example, where the term 'free' is determined to be used most frequently in APIDs for publicly accessible APs, the term 'free' when found in an APID can be indicative of the associated AP being a publicly accessible AP. APID analysis can enable ranking, whitelisting, blacklisting, etc., of APIDs and associated APs. The permission can further be based on historical UE density, e.g., a count of UEs in an area for a period, can be correlated to public/private AP states. As an example, there can be a correlation between high counts of UEs and an area being public, e.g., a high UE density can be generally more common for areas like shopping malls, grocery stores, sporting events, etc., that are typically public. Moreover, public areas can correspond to public AP resources. As such, correlations between historical UE density and an AP having a public character can be employed as a factor in determining the permission related to allowing UE to connect to the AP. As an example, where the AP is located in a historically dense UE area, this can more commonly be associated with a public AP character. Similarly, where the APID comprises a term associated with a public AP character, the combination of the APID and historical UE density can lead to a determination or inference that the AP is a public AP and the permission can be determined accordingly. As another example, where the AP is located in a low-density area and the APID comprises terms indicating a private AP, the permission can be associated with a private AP character. Moreover, where the historical UE density and APID analysis can be factors contributing to ranking of APs, the AP can be ranked as more private or more public in comparison to other APs in the area. Furthermore, certain terms in the APID analysis can be employed to designate an AP as private or public regardless of other factors.

Method 700, at 720, can comprise, for example, a UE receiving a reply to a query about a nearby access point. The permission can generally indicate a public or private nature of the APID associated with the AP. As such, the permission can facilitate the UE determining if it can connect to the AP, e.g., the UE can avoid connecting to private APs and can pursue connecting to public APs. In an aspect, reporting of APIDs and location information by a first UE can enable determining of permissions correlated to the APID. These permissions can then be returned to the first UE or to other UEs.

FIG. 8 illustrates a method 800 that facilitates determining a permission related to an indicator of a public/private access point status based on a keyword and map data in accordance with aspects of the subject disclosure. At 810, method 800 can comprise receiving APID and location information for an AP. In an aspect, the APID can be parsed to determine keywords comprising the APID, for example, an SSID for a Wi-Fi AP can be parsed to capture keywords, which can then be used to infer or determine a public/private character of the associated SSID connection. Determining the public/private character of the AP connection can comprise whitelist, blacklist, ranking, etc. In a further aspect, white/blacklisting can be combined with ranking, e.g., APs can be ranked and certain terms can be used to move an AP to the top or bottom rank, e.g., certain terms can affect rank more substantially than other terms, certain terms can be used to fully escalate, or de-escalate, a rank of an AP, etc. In an aspect, the terms used in analysis of keywords parsed from an APID can be updated to reflect relevant AP identification trends.

At 820, historical UE density information for an area comprising a location of the AP can be received. The location of the AP can be determined by the AP, e.g., where the AP comprises a location technology such as GPS, etc., by systems that map the location of the AP, e.g., deployment information by a network provider, by a user, etc., by substituting proximate UE location information, e.g., the UE is near to the AP and the UE location can be effectively substituted for the AP location, etc. The historical UE density information for the AP location can reflect a probability that the AP is a public or private AP. As an example, an airport can be associated with public APs and a high density of UEs in comparison to a sleepy rural residence that can be associated with a private AP and very low historical UE density.

At 830, method 800 can comprise determining public and private portions of the area based on the historical UE density information. In an aspect, portions of the area, e.g., grids, bins, etc., can be allocated a score relating to a level of public or a level of private AP character based on the historical UE density for the area. As an example, if a grid pattern of 100 meters by 100 meters is used to define 100 portions of a 1 km by 1 km area for which historical UE information is received and wherein the location of the AP is within the area, then the density of each grid square can be determined from the historical UE density information. The UE density can then be used to determine a score that corresponds to a level of public/private character for the grid square based on the historical UE density. A location of an AP, where the AP is in the area, will therefore fall within one of the grid squares and can therefore be associated with the score that corresponds to the level of public/private character for that grid square.

At 840, The APID can be parsed into keywords and ranked based on comparing the keywords to a list of determined terms. Analysis of naming conventions in relation to public/private AP status can be employed to determine a list of terms or an update tot a list of terms. As such, real AP identifiers can be analyzed and inferences or determinations can be made that reflect real public/private AP status associated with the AP identifiers. This can result in a list of terms often associated with public or private APs, which terms can be employed in white/blacklisting, ranking, etc.

Method 800, at 850, can comprise adapting the ranking of the APID, from 840, based on the location of the AP and the public/private score from 830. Where an APID is ranked based on the analysis of keywords in the APID, the rank can be further adapted based on correlations between the location and historical UE density as it relates to public/private AP status. In an embodiment, although not illustrated, the ranking can be first based on the historical UE density and then adapted based on the APID keyword analysis.

At 860, method 800 can comprise enabling access to the ranking of the APID in response to receiving a query comprising the APID. At this point method 800 can end. In an aspect, the response can enable a UE to determine if it will initiate a connection to the AP associated with the APID, e.g., where the ranking indicates a public character, the UE can connect, in contrast to the ranking indicating a private character where the UE would not initiate a connection.

Figure 9:
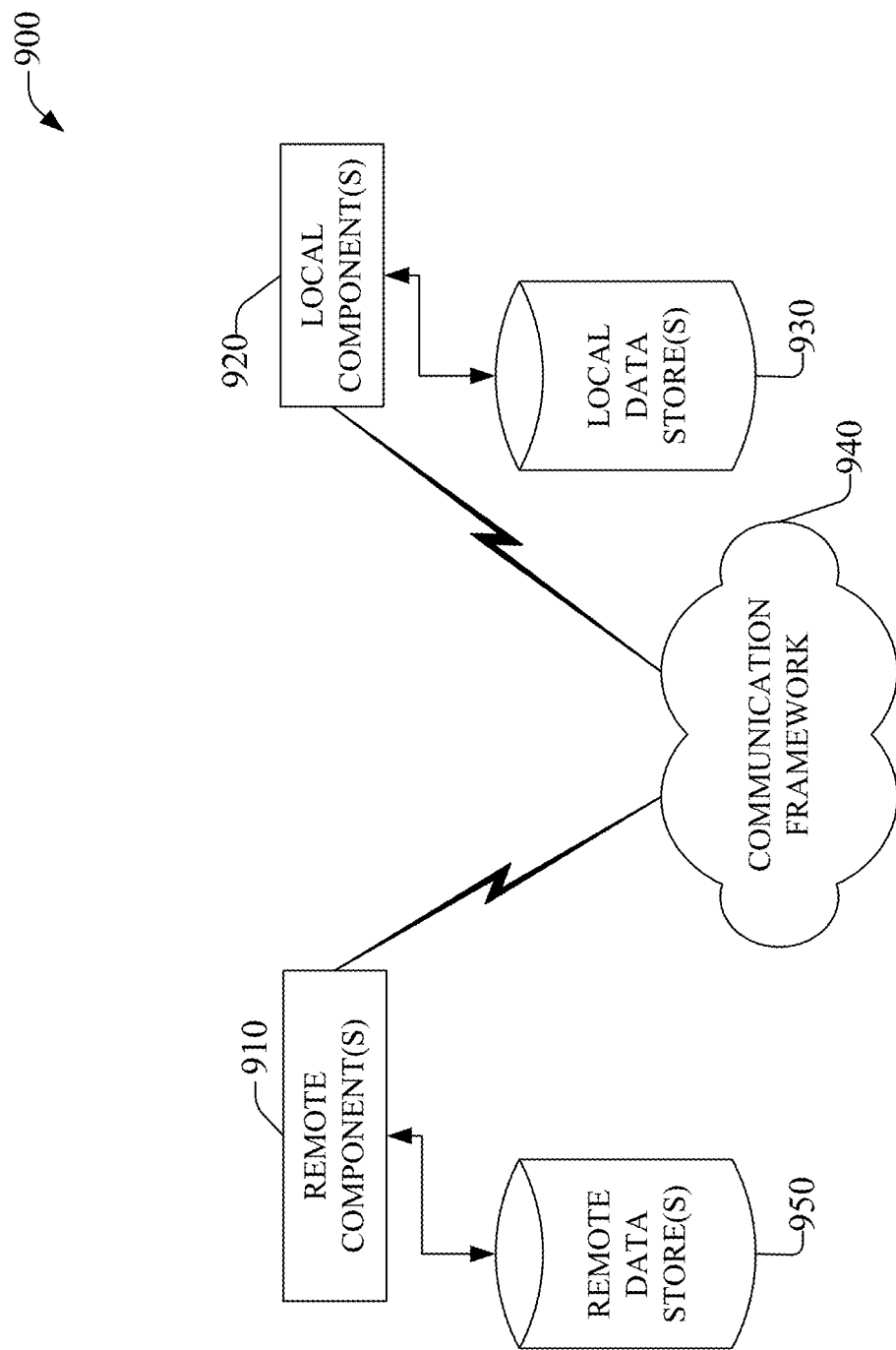
FIG. 9 depicts an example schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be UE 470, 570, etc., access point 402, 404, 502, etc.

The system 900 also includes one or more local component(s) 920. The local component(s) 920 can be hardware and/or software (e.g., threads, processes, computing devices). In some embodiments, local component(s) 920 can include, for example, APPC 110, 210, 310, 410, 510, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
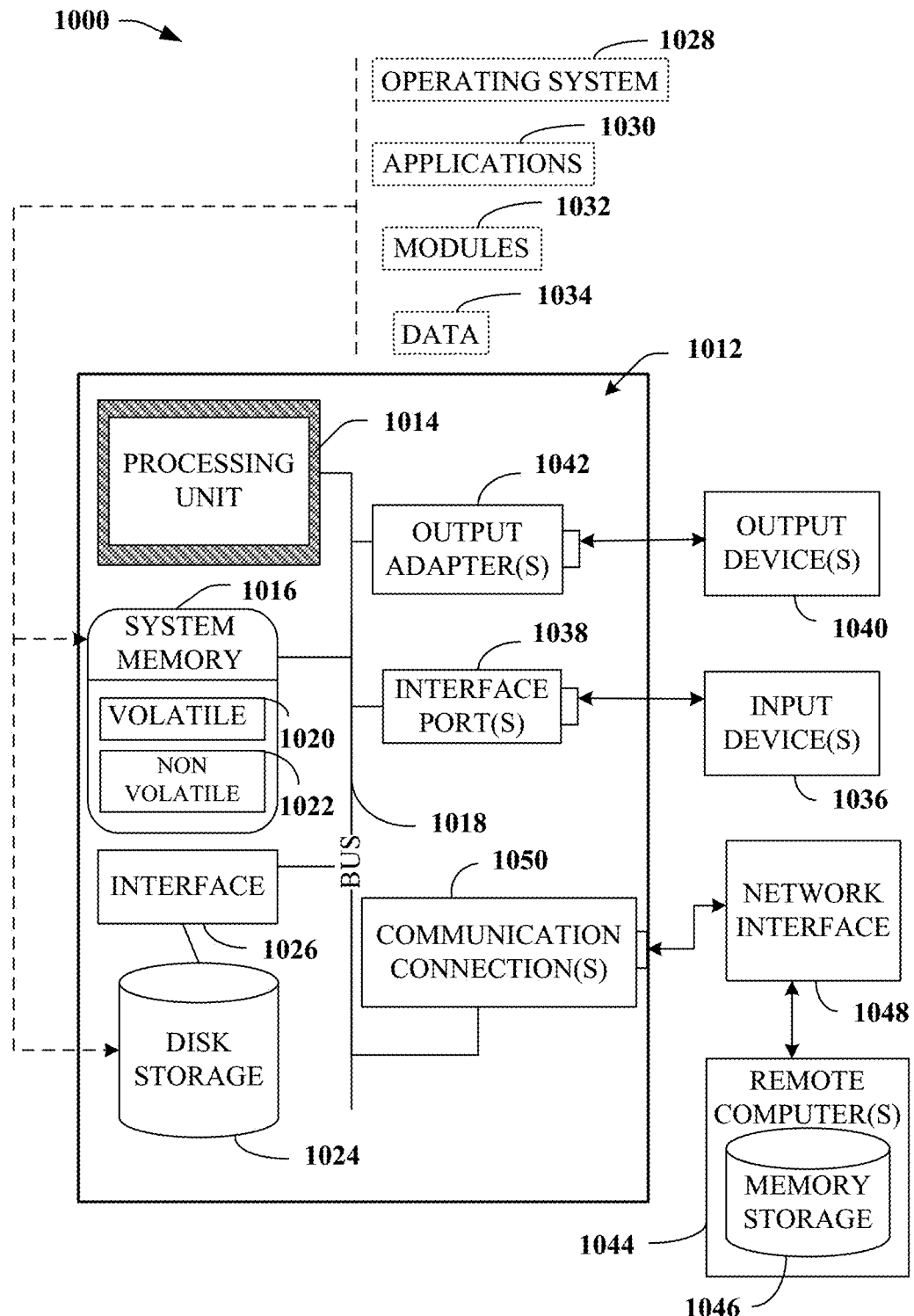
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of APPC 110, 210, 310, 410, 510, etc., access point 402, 404, 502, etc., UE 470, 570, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving APID 120, 220, 320, 422, 424, etc., APLD 122, 222, 322, 422, 424, etc., and in response determine a value related to a public/private character of an AP associated with the APID.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can allow entry of user preference information, etc., and can be embodied in a touch sensitive display panel, a mouse input GUI, a command line controlled interface, etc., allowing a user to interact with computer 1012. As an example, UI Component 584 can receive touch, motion, audio, visual, or other types of input. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, user input can be captured in relation to terms used to analyzed APID 120, 220, 320, 422, 424, etc., map data 240, 340, 440, etc., to enable determining a public/private status of an AP related to the APID, in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   in response to receiving an access point device identifier associated with an access point device, determining a status of the access point device based on a historical user density determined from a count of different user equipments in an area for a determined historical time period, wherein the determining the status of the access point device is further based on map data comprising business location information representative of locations of business entities; and
   enabling a user equipment to initiate a connection to the access point device based on the status.

2. The system of claim 1, wherein the status indicates that the access point is a private access point is intended for use only by a determined group of user devices.

3. The system of claim 1, wherein the status indicates that the access point is a public access point is intended for use by any user device.

4. The system of claim 1, wherein the operations further comprise:
   updating the status in response to a keyword of the access point device identifier.

5. The system of claim 4, wherein the keyword corresponds to an increased likelihood that the access point device is intended to be a publically available access point device.

6. The system of claim 4, wherein the keyword corresponds to a decreased likelihood that the access point device is a private access point device intended for non-public use.

7. The system of claim 4, wherein the keyword is comprised in a white list of keywords.

8. The system of claim 4, wherein the keyword is comprised in a black list of keywords.

9. The system of claim 4, wherein the keyword is 'open'.

10. The system of claim 4, wherein the keyword is 'private'.

11. The system of claim 4, wherein the keyword is 'public'.

12. A user equipment, comprising:
    a processor; and
    a memory that stores executable instructions that, when executed by the processor, facilitate performance of operations, comprising:
    generating a query related to an accessibility of an access point device, wherein the query comprises an access point identifier; and
    initiating a connection to the access point device based on a response to the query comprising a permission score, wherein the permission score is based on a historical user equipment density determined from a historical count of user equipments proximate to a location of the access point device, and wherein the permission score is further based on map data comprising business location information representative of locations of business entities.

13. The mobile device of claim 12, wherein the permission score is indicative of a likelihood that the access point is a private access point is intended for use by only a determined group of user devices.

14. The mobile device of claim 12, wherein the permission score is indicative of a likelihood that the access point is a public access point is intended for use by any user device.

15. The mobile device of claim 12, wherein the permission score is further based on a keyword being determined to be comprised in the access point device identifier.

16. A method, comprising:
receiving, by a system comprising a processor, a query from a user equipment, wherein the query comprises an access point identifier to facilitate determining a character of the access point device; and
generating a response to the query comprising an indicator of the character of the access point device, wherein the indicator is based on a density value determined from a historical count of user equipments proximate to a location of the access point device, wherein the indicator is further based on map data comprising business location information representative of locations of business entities, and wherein the query facilitates the user equipment to initiate a connection to the access point device based on the indicator.

17. The method of claim 16, wherein the indicator value is further based on at least one keyword being comprised in the access point device identifier.

18. The method of claim 17, wherein each keyword of the at least one keyword is associated with a likelihood that the access point device is intended to be a publically available access point device.

19. The method of claim 17, wherein a keyword of the at least one keyword is selected from a group of keywords comprising 'open,' 'public,' 'private,' 'personal,' and 'free'.

20. The mobile device of claim 15, wherein the keyword is selected from a group of keywords comprising 'open,' 'public,' 'private,' 'personal,' and 'free'.

* * * * *